United States Patent [19]

Shirasawa

[11] Patent Number: 5,299,025
[45] Date of Patent: Mar. 29, 1994

[54] METHOD OF CODING TWO-DIMENSIONAL DATA BY FAST COSINE TRANSFORM AND METHOD OF DECODING COMPRESSED DATA BY INVERSE FAST COSINE TRANSFORM

[75] Inventor: Hisao Shirasawa, Yokohama, Japan
[73] Assignee: Ricoh Company, Ltd., Tokyo, Japan
[21] Appl. No.: 903,226
[22] Filed: Jun. 25, 1992

Related U.S. Application Data

[63] Continuation-in-part of Ser. No. 598,895, Oct. 16, 1990.

[30] Foreign Application Priority Data

Oct. 18, 1989 [JP] Japan .................. 1-269127
Feb. 23, 1990 [JP] Japan .................. 2-43710

[51] Int. Cl.$^5$ .................................... H04N 1/46
[52] U.S. Cl. ............................ 358/400; 358/432; 358/433; 364/725; 364/726
[58] Field of Search .......... 358/426, 427, 432, 433; 382/50, 56, 49; 364/728, 726, 724.5

[56] References Cited

U.S. PATENT DOCUMENTS 4,679,163  7/1987  Arnould ..................... 364/725
4,791,598  12/1988  Liou et al. .................. 364/725
5,164,980  11/1992  Bush ......................... 379/53

Primary Examiner—Edward L. Coles, Sr.
Assistant Examiner—John Ning
Attorney, Agent, or Firm—Mason, Fenwick & Lawrence

[57] ABSTRACT

A method of encoding two-dimensional original image data through fast cosine transformation FCT, the method including steps of inputting each block of N×N picture elements from the image data and transforming the block into N×N values of the first FCT coefficients by a first N×1 FCT circuit. The first N×1 FCT circuit uses multiplication factors of prescribed butterfly operations, the factors being multiplied by $\sqrt{2}$. The method further includes storing the first FCT coefficients in a memory and transforming the first FCT coefficients into N×N values of second FCT coefficients by a second N×1 FCT circuit, the second N×1 FCT circuit using multiplication factors of prescribed butterfly operations, the factors being multiplied by $\sqrt{2}$. The method further includes quantizing each of the second FCT coefficients using one of N×N corresponding values from a quantization table, the corresponding values being multiplied by 2. Finally, an entropy encoding of the quantized second FCT coefficients is performed, so as to produce compressed image data.

10 Claims, 18 Drawing Sheets

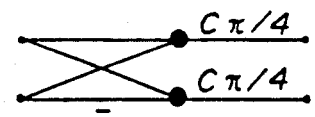 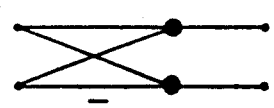
FIG. 7(A)    FIG. 7(B)
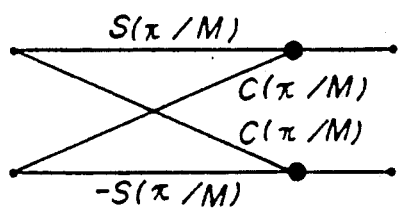 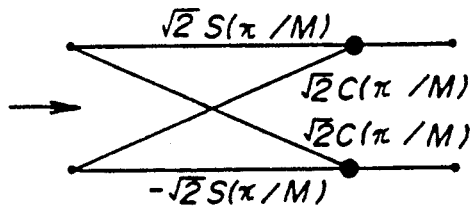
FIG. 8(A)    FIG. 8(B)

FIG.15

| CLOCK / DEVICE | f1 (#1 CLK) | f2 (#2 CLK) | f3 (#3 CLK) | f4 (#4 CLK) |
|---|---|---|---|---|
| ADD 1 | B 4 | B 3 | B 2 | B 1 |
| ADD 2 | B 5 * | B 6 * | B 7 * | B 8 * |
| ADD 3 | C 1 | F 6 * | F 1 * | C 2 |
| ADD 4 | C 4 * | G 6 * | G 1 * | C 3 * |
| ADD 5 | D 7 | D 10 | D 1 | C 7 |
| ADD 6 | D 8 * | D 9 * | D 2 * | C 6 * |
| ADD 7 | F 5 | G 5 | E 1 | E 2 * |
|  |  |  |  |  |
| MPY 1 | F 4 | D 3 | D 4 | F 3 |
| MPY 2 | G 4 | D 5 | D 6 | G 3 |
| MPY 3 | C 8 | C 5 | F 2 | G 2 |

✕ : SUBTRCTN

FIG. 18

| CLOCK<br>DEVICE | f1<br>(#1CLK) | f2<br>(#2CLK) | f3<br>(#3CLK) | f4<br>(#4CLK) |
|---|---|---|---|---|
| ADD 1 | D1 | B4 | B3 | C2 |
| ADD 2 | D2* | B5* | B6* | C3* |
| ADD 3 | E2 | F6* | F1* | B1 |
| ADD 4 | E1* | G6* | G1* | B8* |
| ADD 5 | D7 | D10 | B2 | C7 |
| ADD 6 | D8* | D9* | B7* | C6* |
| ADD 7 | F5 | G5 | C4* | C1 |
|  |  |  |  |  |
| MPY 1 | F4 | D5 | D3 | F3 |
| MPY 2 | G4 | D6 | D4 | G3 |
| MPY 3 | C8 | C5 | F2 | G2 |

\* SUBTRCTN

METHOD OF CODING TWO-DIMENSIONAL DATA BY FAST COSINE TRANSFORM AND METHOD OF DECODING COMPRESSED DATA BY INVERSE FAST COSINE TRANSFORM

CROSS-REFERENCE TO RELATED APPLICATION

The present application is a continuation-in-part (CIP) patent application of co-pending U.S. patent application Ser. No. 07/598,895, filed Oct. 16, 1990, which application is incorporated herein by reference as if reproduced in full below.

BACKGROUND OF THE INVENTION

1. Field of the Invention

The present invention generally relates to data compression/restoration methods, and more particularly to a method of encoding two-dimensional image data into compressed information by fast cosine transformation (FCT) and a method of decoding the compressed information by inverse fast cosine transformation (IFCT).

2. Related Art

Conventionally, several kinds of orthogonal transformation have been used in the field of digital signal processing. Among these kinds of the orthogonal transformation, the discrete cosine transformation (DCT) is widely used for speech signal processing and image data compression, because when discrete cosine transformation is used spectrum power concentrates primarily in a low frequency range. In general, a linear discrete cosine transformation (DCT) with respect to an input data including the number (N) of elements x(n) is defined as follows:

$$X(k) = (2/N)c(k) \sum_{n=0}^{N-1} x(n)\cos[(2n + 1)k\pi/2n] \quad (1)$$

$$(k = 0, 1, \ldots, N - 1)$$

Because Formula (1) concerning a linear data contains a coefficient "2/N", the result of computing a two-dimensional DCT using the Formula (1) twice will have a coefficient "(2/N)$^2$". This number "N" of the elements of the input data is selected from among numbers equal to powers of 2. Therefore, the coefficient as a part of the formula can be calculated simply through a bit shifting.

A linear inverse discrete cosine transformation (IDCT) with respect to an input data including the number (N) of elements X(k) is defined as follows:

$$x(n) = \sum_{k=0}^{N-1} c(k)X(k)\cos[(2n + 1)k\pi/2n] \quad (2)$$

$$(n = 0, 1, \ldots, N - 1)$$

$$c(k) = 1/\sqrt{2} \ (k = 0), c(k) = 1 \ (k \neq 0)$$

The above described DCT and IDCT can be computed by repeatedly performing arithmetic operations of addition and multiplication. Generally, there are three major techniques for computing a discrete cosine transformation (DCT) of two-dimensional input data or computing an inverse discrete cosine transformation (IDCT):

a) performing polynomial calculations with respect to picture elements (pixels) in rows of input data, and, independently of the above polynomial calculations, performing polynomial calculations of picture elements in columns of the input data;

b) performing linear DCT/IDCT calculations of elements in rows of input data and independently performing linear DCT/IDCT calculations of elements in columns of the input data; and c) perform two-dimensional DCT/IDCT calculations for each one block into which a matrix of the input data is divided.

The above method a) enables the computation of the two-dimensional DCT/IDCT by repeatedly performing additions and multiplications. This method is suitable for computations by means of digital signal processors (DSP) and the like. However, the above method a) is not adequate for carrying out high speed computation because it requires a great number of operations to be executed to complete the computation.

The above method c) can achieve the computation of the two-dimensional DCT/IDCT by performing a relatively small number of operations, but it must carry out a complicated procedure of computation and it is often very difficult to properly control the computation unit for computing the two-dimensional DCT/IDCT by the above method c). Therefore, there are presently no practical computation techniques or apparatus in which the method c) is implemented.

FIG. 6 of the parent patent application is a diagram for explaining the principle of the data compression/restoration to which the above method b) is applied. For carrying out a two-dimensional data compression, two-dimensional image input data is divided into prescribed blocks (for example, 8×8 pixel arrays). A first linear DCT circuit 31 shown in FIG. 6 calculates a linear discrete cosine transformation with respect to 8 pixels in rows of one 8×8 block into which the two-dimensional image data is divided, and the result of computing the linear discrete cosine transformation, or the output of the first linear DCT circuit 31, is stored in a transposition memory 32. Next, a second linear DCT circuit 33 reads out the data concerned from the transposition memory 32 and again independently computes a linear discrete cosine transformation with respect to the eight picture elements in columns of the 8×8 block. Then, two-dimensional data containing the information obtained through the linear DCT being twice repeated, is quantized by a quantization circuit 34. The resultant data is transmitted to a given unit on a receiving side or is recorded in a given storage medium.

Recently, international standardization efforts for developing a standard of data compression techniques for coding a natural static image data into compressed information are under way. A technique of computing a two-dimensional DCT technique by means of an 8×8 pixel data unit will certainly be chosen as the international standard. As described above, computation of the two-dimensional DCT can be realized by performing linear DCT calculations independently with respect to elements in rows and columns. However, for obtaining the two-dimensional DCT of two-dimensional data of one block having 8×8 picture elements in accordance with Formula (1) above, 1024 real number multiplications and 896 additions must be computed per block. Accordingly, for calculating the two-dimensional DCT with respect to information of one screen containing 512×512 picture elements, at least approximately 4.20 million (=1024×(512/8)×(512/8)) real number multiplications must be executed. This calculation is quite time-consuming.

To achieve more rapid computation of this kind of arithmetic operations, Applicant has realized that a conventional fast cosine transformation (FCT) and inverse fast cosine transformation (IFCT) can be applied, and the linear DCT circuits 31, 33 of the parent patent application may be replaced by FCT circuits and the linear IDCT circuits 36, 38 may be replaced by IFCT circuits, respectively, as indicated by parentheses in FIG. 6.

In general, several algorithms for computing the FCT and the IFCT have been proposed. Among these algorithms, there are two conventional algorithms worthy of mention here. One is Chen's 8-element FCT and IFCT algorithms which are shown in FIGS. 1 and 2, respectively. The other is Wang's 8-element FCT and IFCT algorithms which are shown in FIGS. 4 and 5, respectively. In these drawings, a black circle denotes "add" operation and a white circle indicates no operation. Symbols placed along a straight line connecting one circle to another as indicated in these drawings, such as "Ck$\pi$", "Sk$\pi$", are an abbreviated symbol that indicates a trigonometric value used as a multiplication factor in a butterfly operation. For example, "Ck$\pi$" denotes the value of cos (k$\pi$) and "Sk$\pi$" indicates the value of sin (k$\pi$). In a case of the Chen's algorithms shown in FIGS. 1 and 2, the computations of 8-element linear DCT and 8-element linear IDCT are each realized by sixteen (16) real number multiplications and twenty-six (26) additions. And, in a case of the Wang's algorithms shown in FIGS. 4 and 5, they are each realized by twenty (20) real number multiplications and twenty six (26) additions.

In addition, FIG. 3A shows a typical example of butterfly operation, and FIG. 3B shows a modified example of the butterfly operation. By applying this modified butterfly operation to the Chen's algorithms shown in FIGS. 1 and 2, it is possible to achieve the computation of the 8-element linear DCT or the 8-element linear IDCT by means of thirteen (13) real number multiplications and twenty nine (29) additions. Accordingly, the use of the modified butterfly operations will allow the computation of two-dimensional DCT and two-dimensional IDCT with respect to one block having 8×8 picture elements by means of 200 real number multiplications and 465 additions. When compared with the above described case in which simple multiplications and simple additions are used, the number of arithmetic operations required can be reduced to 1/5, thus allowing a faster computation for data compression and restoration to be carried out.

In order to increase the speed of computation, it is necessary to minimize the number of multiplications to be executed, because a "multiply" operation takes much greater computation time than that of an "add" operation. And, in order to achieve faster encoding of two-dimensional data or decoding of compressed information into the original two-dimensional data, it is desired to minimize the number of real number multiplications required for the linear FCT or the linear IFCT. However, conventional linear FCT and IFCT techniques do not provide sufficient computation speed and therefore require much computation time. There still is a need to improve the efficiency of use of computing devices in FCT and IFCT circuits.

SUMMARY OF THE INVENTION

Accordingly, it is a general object of the present invention to provide improved image data compression and decompression methods, in which the above-described problems are eliminated.

Another and more specific object of the present invention is to provide an image data compression method which can rapidly encode image data through a fast cosine transformation process by means of a simple FCT-based encoder. The above-mentioned object of the present invention is achieved by an image data encoding method which includes the steps of: a) inputting each block of N×N picture elements from the two-dimensional original image data; b) using a first N×1 FCT circuit, transforming the N×N picture elements of each block into N×N values of first FCT coefficients, the first N×1 FCT circuit having multiplication factors of prescribed butterfly operations that generate the first FCT coefficients, the multiplication factors being multiplied by $\sqrt{2}$; c) storing in a transposition memory the N×N values of the first FCT coefficients that are output by the first N×1 FCT circuit; d) using a second N×1 FCT circuit, transforming the N×N values of the first FCT coefficients supplied from the transposition memory into N×N values of (15 second FCT coefficients, the second N×1 FCT circuit having multiplication factors of prescribed butterfly operations for generating the second FCT coefficients, the multiplication factors being multiplied by $\sqrt{2}$; e) quantizing each of the N×N values of the second FCT coefficients using one of N×N corresponding values from a quantization table, the N×N corresponding values being multiplied by 2; and f) entropy-encoding the quantized second FCT coefficients so as to produce compressed image data described in blocks of N×N output values.

According to the present invention, it is possible to carry out rapid image data compression because the number of required multiplications is reduced from that in the prior art, by making use of the modified multiplication factors of the prescribed butterfly operations and modified quantization table factors of the quantization table. Each of the first and second linear FCT circuits has only three multipliers and seven adders, thus allowing a simple, small-sized circuitry of an FCT-based encoder. Also, according to the present invention, it is possible to achieve an efficient pipelining process of image data compression without causing operational delay within the FCT-based encoder.

Still another object of the present invention is to provide an image data decompression method which can achieve rapid decoding of compressed image data through an inverse fast cosine transformation process by means of a simple, small-sized FCT-based decoder. The above mentioned object of the present invention is achieved by an image data decoding method which includes the steps of a) entropy-decoding each block of the two-dimensional compressed image data so as to generate N×N values of quantized FCT coefficients; b) dequantizing each of the quantized FCT coefficients so as to generate a set of N×N values of first FCT coefficients; c) using a first N×1 IFCT circuit, inversely transforming the N×N values of the first FCT coefficients into N×N values of second FCT coefficients, the first N×1 IFCT circuit having multiplication factors of prescribed butterfly operations for generating the second FCT coefficients, the multiplication factors being multiplied by $\sqrt{2}$; d) storing in a transposition memory the N×N values of the second FCT coefficients output by the first N×1 IFCT circuit; and e) using a second N×1 IFCT circuit, inversely transforming the N×N values of the second FCT coefficients supplied from the memory so as to produce reconstructed image data described in blocks of N×N output values, the second N×1 IFCT circuit having multiplication factors of prescribed butterfly operations for generating the reconstructed image data, the multiplication factors being multiplied by $\sqrt{2}$, in which the dequantizing step includes using one of N×N corresponding values from an inverse quantization table, the N×N corresponding values being multiplied by $\frac{1}{2}$.

According to the present invention, it is possible to carry out rapid image data decompression because the required number of multiplications is reduced from that in the prior art, by making use of the modified multiplication factors of the prescribed butterfly operations and modified dequantization table factors of the dequantization table. Each of the first and second IFCT circuits has only three multipliers and seven adders, thus allowing a simple, small-sized circuitry of an FCT-based decoder. Also, according to the present invention, it is possible to achieve efficient pipelining process of image data decompression without causing operational delay within the FCT-based decoder.

Other objects and further features of the present invention will become more apparent from the following detailed description when read in conjunction with the accompanying drawings.

BRIEF DESCRIPTION OF THE DRAWINGS

The invention is better understood by reading the following Detailed Description of the Preferred Embodiments with reference to the accompanying drawing figures, in which like reference numerals refer to like elements throughout, and in which:

FIGS. 7(A) and 7(B), and FIGS. 8(A) and 8(B), which may be collectively referred to herein as FIGS. 7 and 8, respectively, are diagrams for explaining the principle of linear transformation of multiplication factors, which may be applied to the present invention.

FIG. 15 is a diagram showing an example of the assignment to operation devices which may be applied to the FCT circuit shown in FIG. 13;

FIG. 18 is a diagram showing an example of the assignment of operations to operation devices which may be applied to the IFCT circuit shown in FIG. 16.

DETAILED DESCRIPTION OF THE PREFERRED EMBODIMENTS

Figure 1:
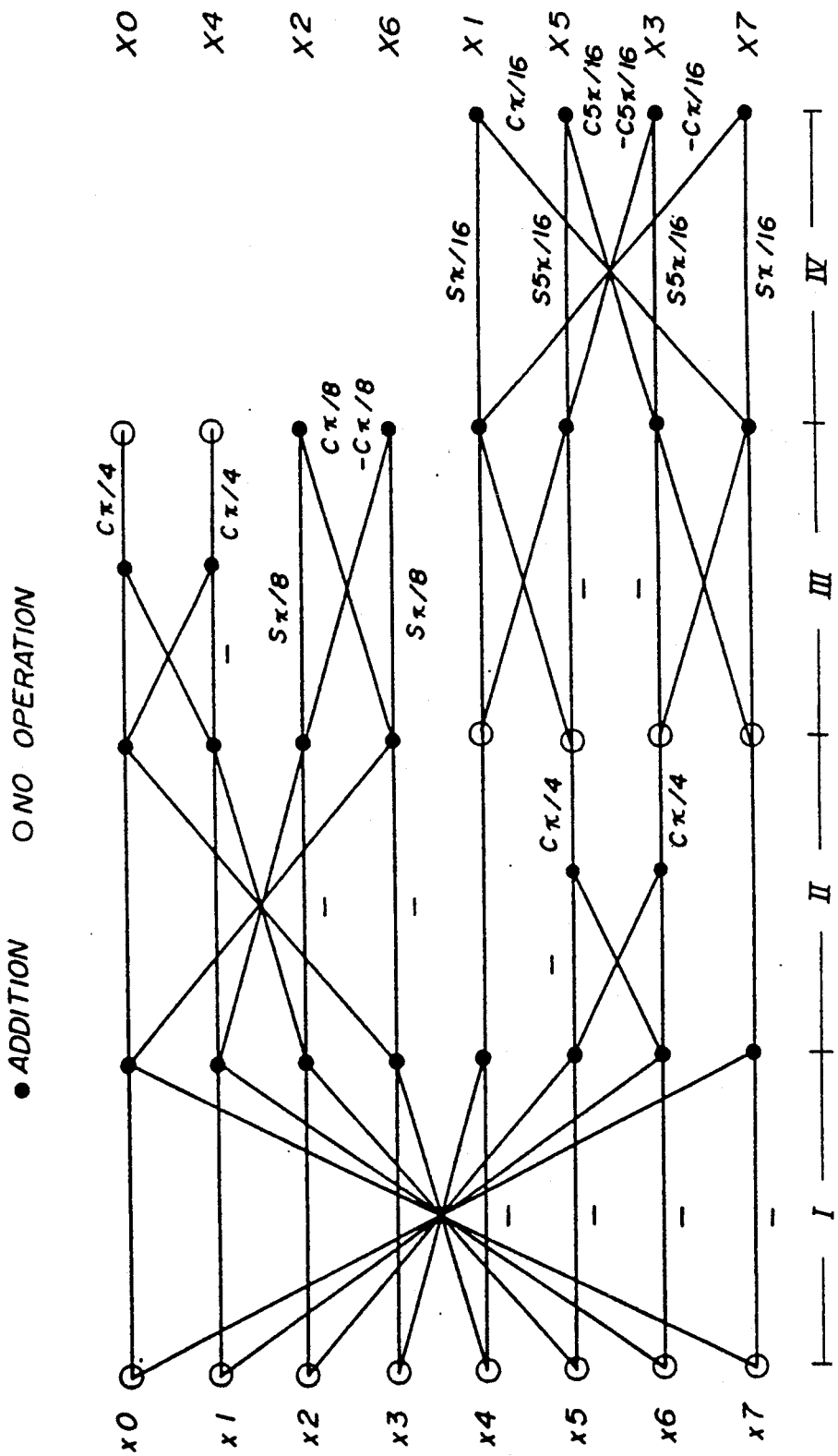
FIG. 1 is a diagram for explaining a conventional 8-element Chen FCT algorithm.

In describing preferred embodiments of the present invention illustrated in the drawings, specific terminology is employed for the sake of clarity. However, the invention is not intended to be limited to the specific terminology so selected, and it is to be understood that each specific element includes all technical equivalents which operate in a similar manner to accomplish a similar purpose.

Figure 6:
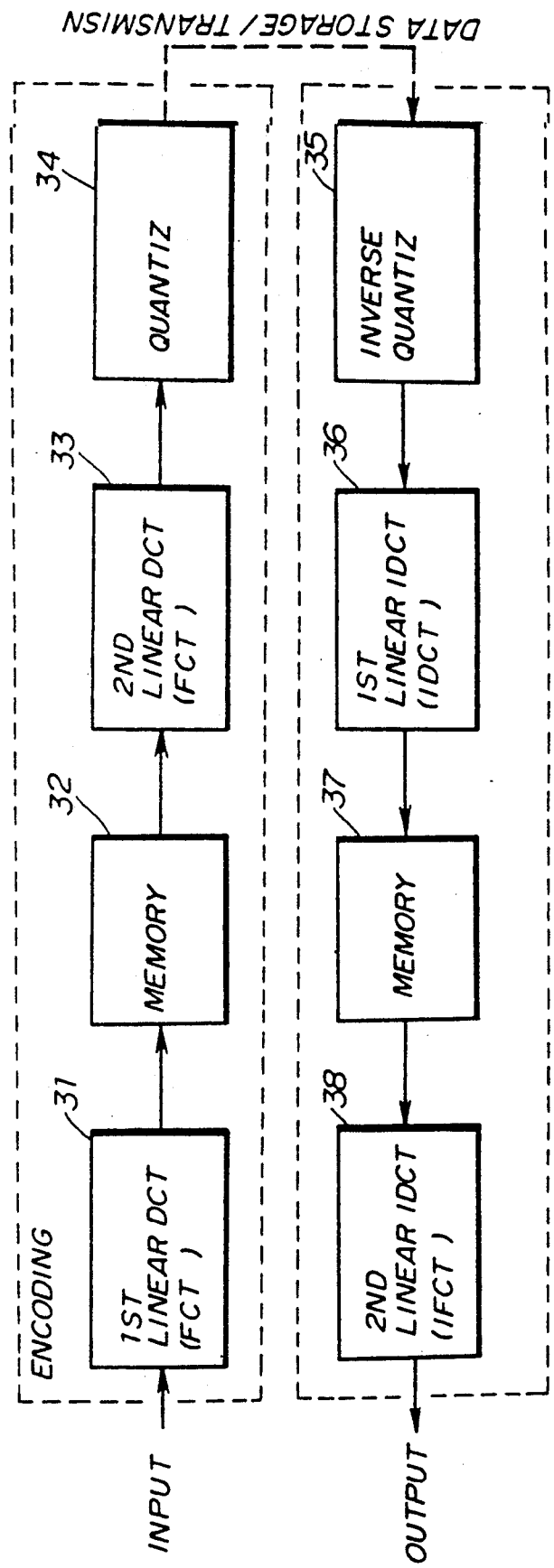
FIG. 6 is a diagram, reproduced from the parent patent application, for explaining a principle of data compression and restoration of two-dimensional information, as discussed in the Background of the Invention in the present patent application.
Figure 6A:
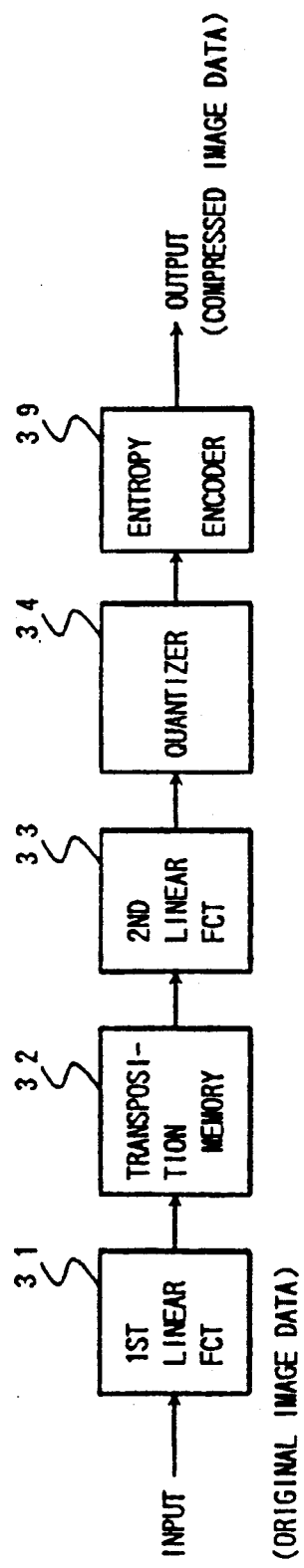
FIGS. 6A and 6B are diagrams for explaining the principle of image data compression and decompression processes according to the present invention.

A description will be given of the principle of image data compression and decomposition processes according to a preferred embodiment of the present invention, with special reference to FIGS. 6A and 6B. FIG. 6A shows an image data compression method for encoding two-dimensional original image data into compressed image data. For the sake of convenience, the two-dimensional original image data is described in a set of blocks of 8×8 pixels (picture elements).

In FIG. 6A, a first linear FCT circuit 31 transforms 8×8 pixels of each block of the input image data into 64 values of first FCT coefficients. (The transformation by the first linear FCT circuit 31 is performed with respect to 8 pixels in each row of each block of the input image data.) The resulting values of the first FCT coefficients are stored in a transposition memory 32. These first linear FCT coefficients are supplied from the transposition memory 32 to a second linear FCT circuit 33. Independently of the first linear FCT circuit 31, the second linear FCT circuit 33 transforms those values of the first linear FCT coefficients into 64 values of second FCT coefficients. One of these 64 values is referred to as a DC coefficient, and the other 63 values as AC coefficients.

Each of 64 values of the second FCT coefficients is then quantized by a quantizer 34 shown in FIG. 6A using one of 64 corresponding values from a quantization table. The 64 corresponding values in the quantization table are determined by a table specification. In FCT-based encoder applications, these values of the quantization table should be determined so as to customize the picture quality for their particular image characteristics, display devices and viewing conditions.

A table specification according to the present invention will be described below in more detail.

After quantization, the DC coefficient and the 63 AC coefficients are prepared for entropy encoding, as shown in FIG. 6A. The previous quantized DC coefficient is used to predict the current quantized DC coefficient, and a difference between the two coefficients is encoded. In preparation for entropy encoding, the quantized DC coefficient (which is a coefficient zero in the array) is treated separately from the 63 quantized AC coefficients. The 63 quantized AC coefficients undergo no such differential encoding, but are converted into a one-dimensional zig-zag sequence.

All of the quantized coefficients are then passed to an entropy encoding procedure. This entropy encoding procedure is carried out by an entropy encoder 39 for compressing the image data further. One of two entropy encoding procedures can be used, Huffman encoding and arithmetic encoding. If Huffman encoding is used, Huffman table specifications must be provided to the FCT-based encoder. If arithmetic encoding is used, arithmetic encoding conditioning table specifications must be provided.

Figure 6B:
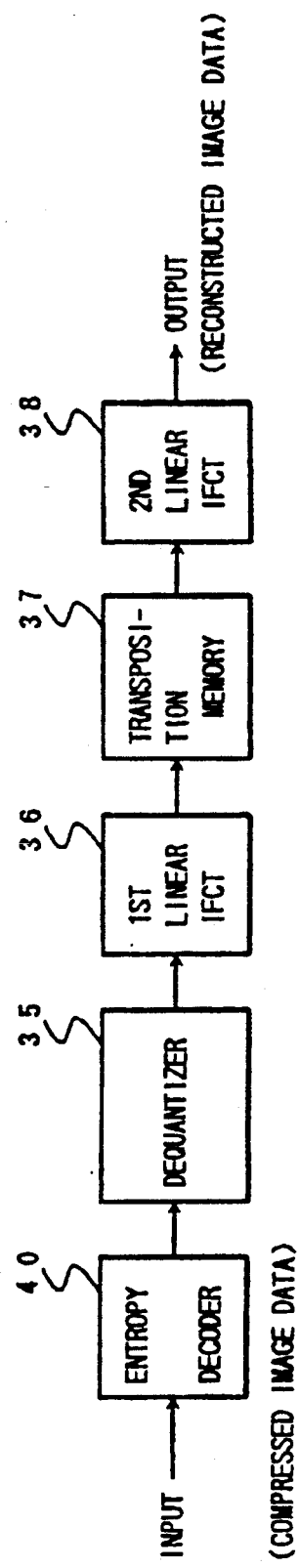

FIG. 6B shows an image data decompression method for decoding two-dimensional compressed image data into reconstructed image data An. FCT-based decoder shown in FIG. 6B carries out image data decoding process which is essentially the inverse of the encoding process performed by the FCT-based encoder shown in FIG. 6A. In FIG. 6B, after compressed image data described in a set of blocks of 8×8 picture elements is received, an entropy decoder 40 decodes the compressed image data into a set of 64 values of quantized FCT coefficients. A dequantizer 35 dequantizes each of the quantized FCT coefficients so as to generate a set of 64 values of first FCT coefficients.

After dequantization, a first linear IFCT circuit 36 inversely transforms the 64 values of the first FCT coefficients into a set of 64 values of second FCT coefficients. These 64 values of the second FCT coefficients are stored in a transposition memory 37. The second FCT coefficients are supplied from the memory 37 to a second linear IFCT circuit 38. The second linear IFCT circuit 38 inversely transforms the second FCT coefficients so as to generate reconstructed image data described in a set of blocks of 8×8 output values.

Next, a description will be given of the principle of a data compression/restoration method according to the present invention, with special reference to FIGS. 7A, 7B and FIGS. 8A, 8B.

Basically, butterfly operations in the linear FCT and the linear IFCT may be classified into two major types, one type being shown in FIG. 7A and the other being shown in FIG. 8A. In the butterfly operation of the type shown in FIG. 7A, the value of a multiplication factor $\cos \pi/4$ ("$C\pi/4$") is equal to $1/\sqrt{2}$, and this multiplication factor changes to $1$ ($=1/\sqrt{2}\times\sqrt{2}$) by multiplying it by $\sqrt{2}$, as shown in FIG. 7B. This allows the calculation of this part of multiplication to be omitted. In the butterfly operation of the other type shown in FIG. 8A, the value of each of multiplication factors $\sin (\pi/M)$ ("$S\pi/M$") and $\cos (\pi/M)$ ("$C\pi/M$") changes if they are multiplied by $\sqrt{2}$, but the number of multiplications required remains unchanged even when being multiplied by 2. Therefore, the use of the above method (multiplying the multiplication factors by 2) for computing the linear FCT and the linear IFCT (by means of circuits as shown in FIGS. 7B and 8B) enables the total number of multiplications to be reduced by 2. Accordingly, it is possible to increase the speed of computation of the linear FCT or the linear IFCT and reduce the time required for the computation.

When the linear FCT and the IFCT are computed by multiplying certain multiplication factors in butterfly operations by 2 as described above, the number of multiplications required can be reduced, but the output of the two-dimensional FCT or the two-dimensional IFCT, through the linear transformation made twice with respect to 8 elements in rows and columns, is two times ($\sqrt{2}\times\sqrt{2}=2$) as great as the value of the input. To compensate for this problem, when data compression is carried out, specific factors in a quantization table which is used by the quantization circuit 34 shown in FIG. 6 are previously multiplied by 2. When the quantization is made by the quantization circuit 34, the above output of the two-dimensional FCT or the two-dimensional IFCT, which is two times the value of the input, is divided by 2. The final output after the quantization has a value equal to that corresponding to the input. Therefore, it is possible to obtain the correct results of the data compression in accordance with the original image data.

As for restoration of the compressed data, specific factors in a quantization table which is used by the inverse quantization circuit 35 shown in FIG. 6 are previously multiplied by $\frac{1}{2}$. When the inverse quantization is made by the inverse quantization circuit 35, the information transmitted to the circuit 35 is divided by these specific factors which are multiplied by $\frac{1}{2}$, and the results of the inverse quantization are equal to two times the value of the input information. The results of the inverse quantization are multiplied by $\frac{1}{2}$ through the linear IFCT being made twice by the first and second linear IFCT circuits 36 and 38. The final output after the linear inverse transformation being made twice, has a value equal to that corresponding to the input. Therefore, it is possible to obtain the correct results of the data restoration in accordance with the transmitted information.

The above discussion is made concerning two-dimensional data in one block containing 8×8 picture elements. The same discussion may be applied to a case in which a two-dimensional data in one block containing N×N picture elements is dealt with. For this purpose, it is necessary to define the linear FCT transformation of N elements and the factors in the quantization table used by the quantization circuit 34, as well as the linear IFCT transformation and the factors in the inverse quantization table used by the inverse quantization circuit 35 as follows:

a) converting linearly predetermined multiplication factors in butterfly operations of the N-element linear FCT so that the output of the linear FCT is equal to $\sqrt{2}$ times the corresponding input.

b) Converting linearly predetermined multiplication factors in butterfly operations of the N-element linear IFCT so that the output of the linear IFCT is equal to $\sqrt{2}$ times the corresponding input.

c) In accordance with a) above, specific table elements within the quantization table used in the quantization circuit 34 are multiplied by 2.

d) In accordance with b) above, specific table elements within the inverse quantization table used in the inverse quantization circuit 35 are multiplied by $\frac{1}{2}$.

In addition, all the arithmetic operations being executed in the FCT algorithm for carrying out the data compression method or the IFCT algorithm for carrying out the data restoration method by using a FCT apparatus or a IFCT apparatus according to the present invention, are classified into three multiplication types and seven addition types. All the arithmetic operations thus classified are executed in a parallel manner using three multipliers and seven adders within the FCT apparatus or the IFCT apparatus. Accordingly, pipelining the additions and multiplications can be achieved without causing pauses during operation of the adders and the multipliers.

Figure 9:
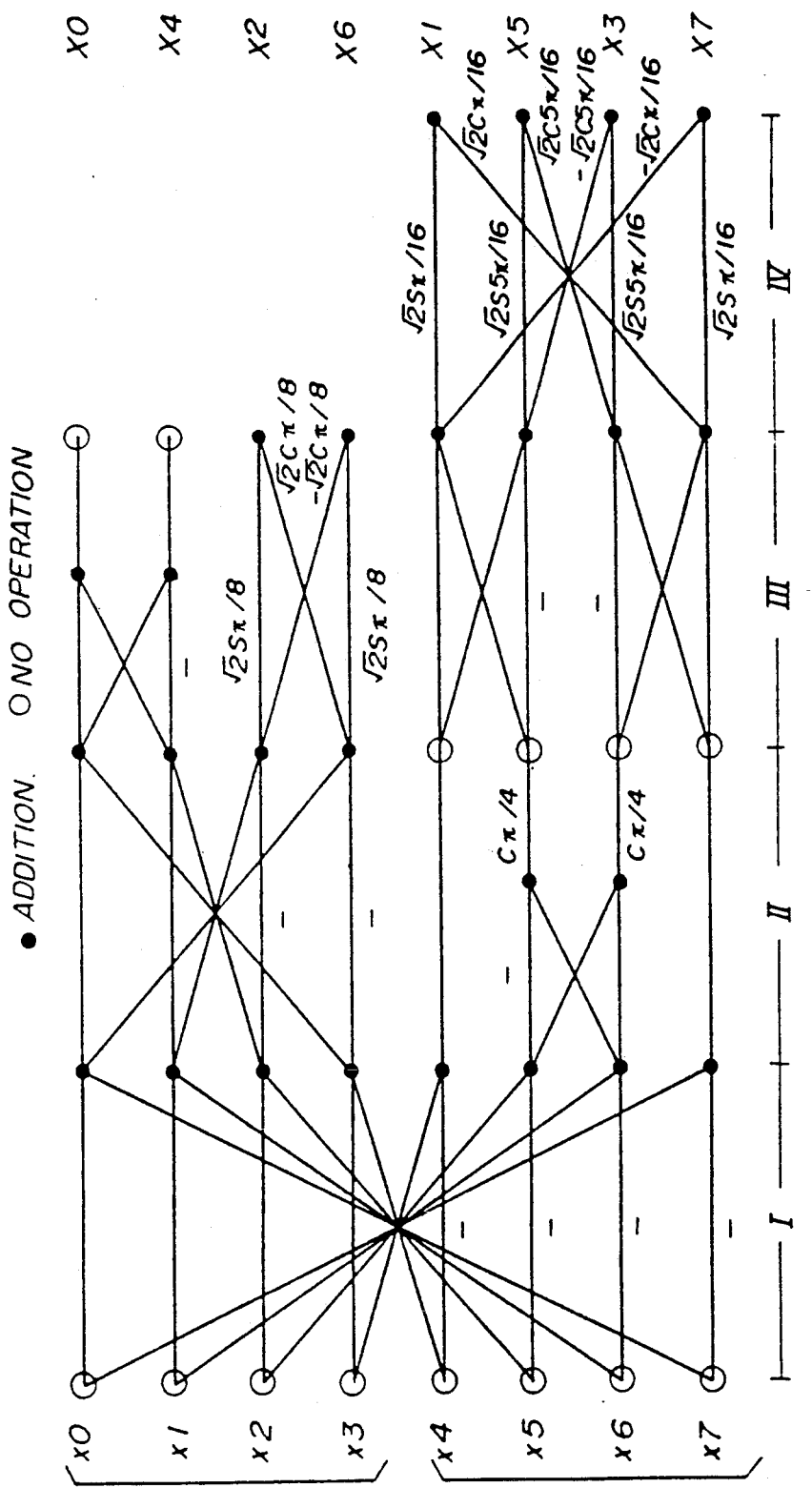
FIG. 9 is a diagram for explaining a first embodiment of an 8-element linear FCT according to the present invention.

Next, a description will be given of a first embodiment of the data compression/restoration method according to the present invention, with special reference to FIGS. 9 and 10. FIG. 9 shows the algorithm of an improved Chen's 8-element linear fast cosine transformation (FCT), while FIG. 10 shows the algorithm of an improved Chen's 8-element linear inverse cosine transformation (IFCT).

Figure 10:
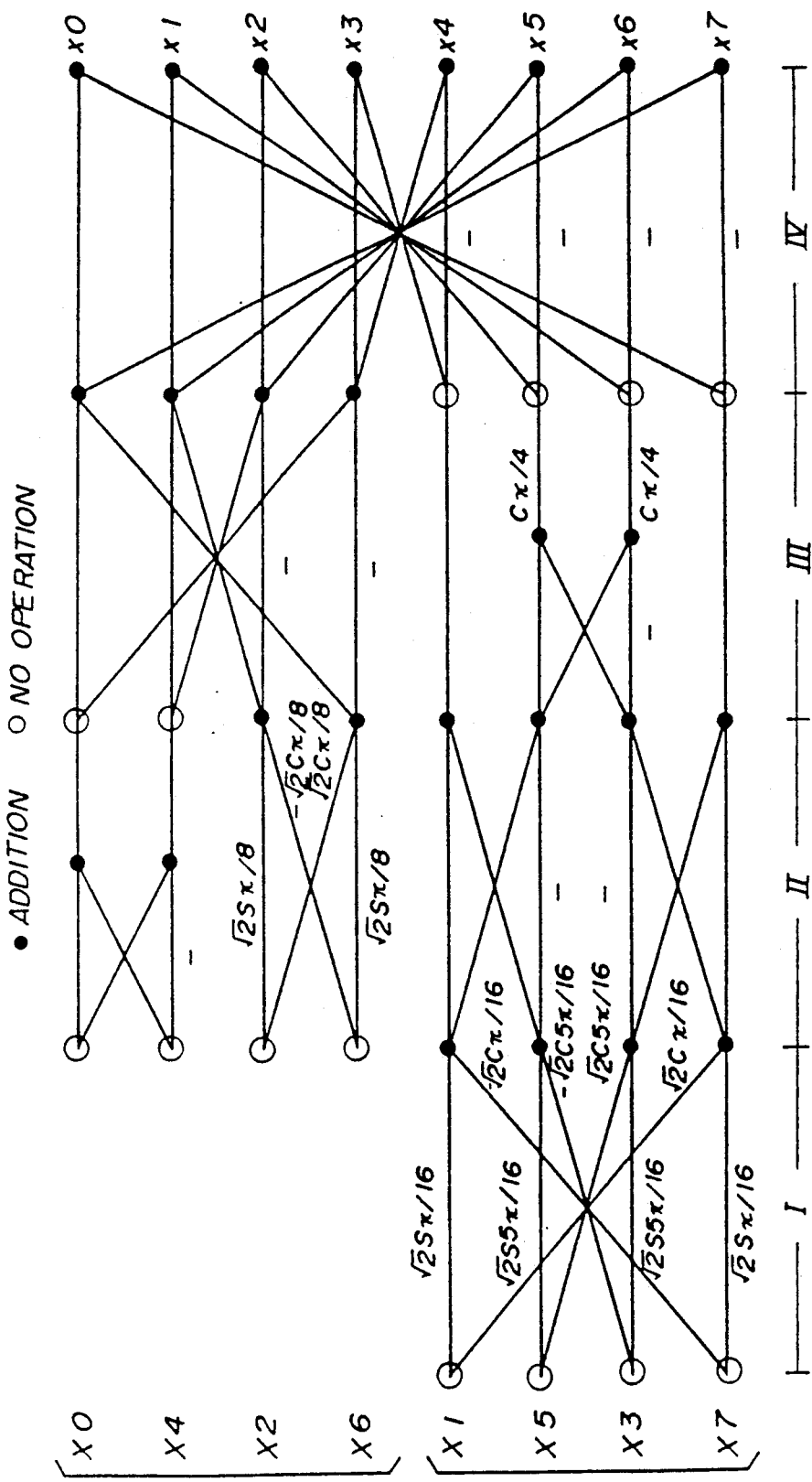
FIG. 10 is a diagram for explaining a first embodiment of an 8-element linear IFCT according to the present invention.

As can be seen from FIG. 9, multiplication factors with respect to the upper four places x0 through x3 of the input information in a third step of the improved FCT algorithm, indicated by "III" in FIG. 9, are multiplied by $\sqrt{2}$, and multiplication factors with respect to the lower four places x4 through x7 thereof in a fourth step of the improved FCT algorithm, indicated by "IV" in FIG. 10, are also multiplied by $\sqrt{2}$. As the result, the outputs X0 through X7 of the linear FCT respectively are equal to $\sqrt{2}$ times the values of the inputs x0 through x7. Therefore, it is possible to carry out a two-dimensional FCT by executing the improved Chen's 8-element linear FCT to which the above algorithm shown in FIG. 9 is applied with respect to both the elements in rows and the elements.

As for the algorithm for computing the improved Chen's 8-element linear IFCT as shown in FIG. 10, multiplication factors with respect to the upper four places X0, X4, X2, X6 of the input information in a second step of the algorithm, indicated by "II" in FIG. 10, are multiplied by $\sqrt{2}$, while multiplication factors with respect to the lower four places X1, X5, X3, X7 in a first step of the algorithm, indicated by "I" in FIG. 10 are multiplied by $\sqrt{2}$.

As the result, the outputs x0 through x7 of the linear IFCT respectively are equal to $\sqrt{2}$ times the values of the inputs X0 through X7. Therefore, it is possible to carry out a two-dimensional IFCT by executing the improved Chen's 8-element linear IFCT to which the above algorithm shown in FIG. 10 is applied with respect to both the elements in rows and the elements.

Figure 11:
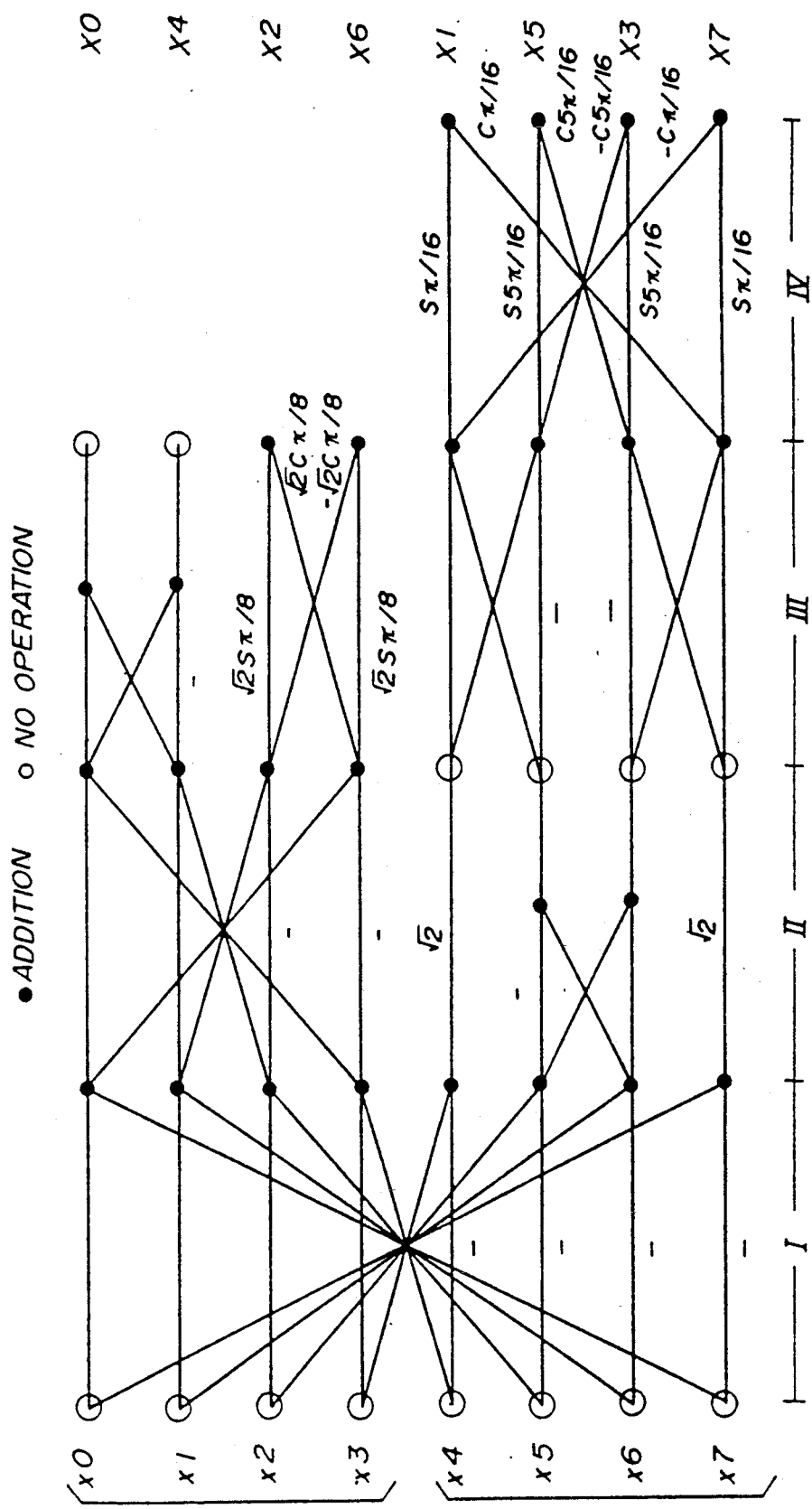
FIG. 11 is a diagram for explaining a second embodiment of an 8-element linear FCT according to the present invention.
Figure 12:
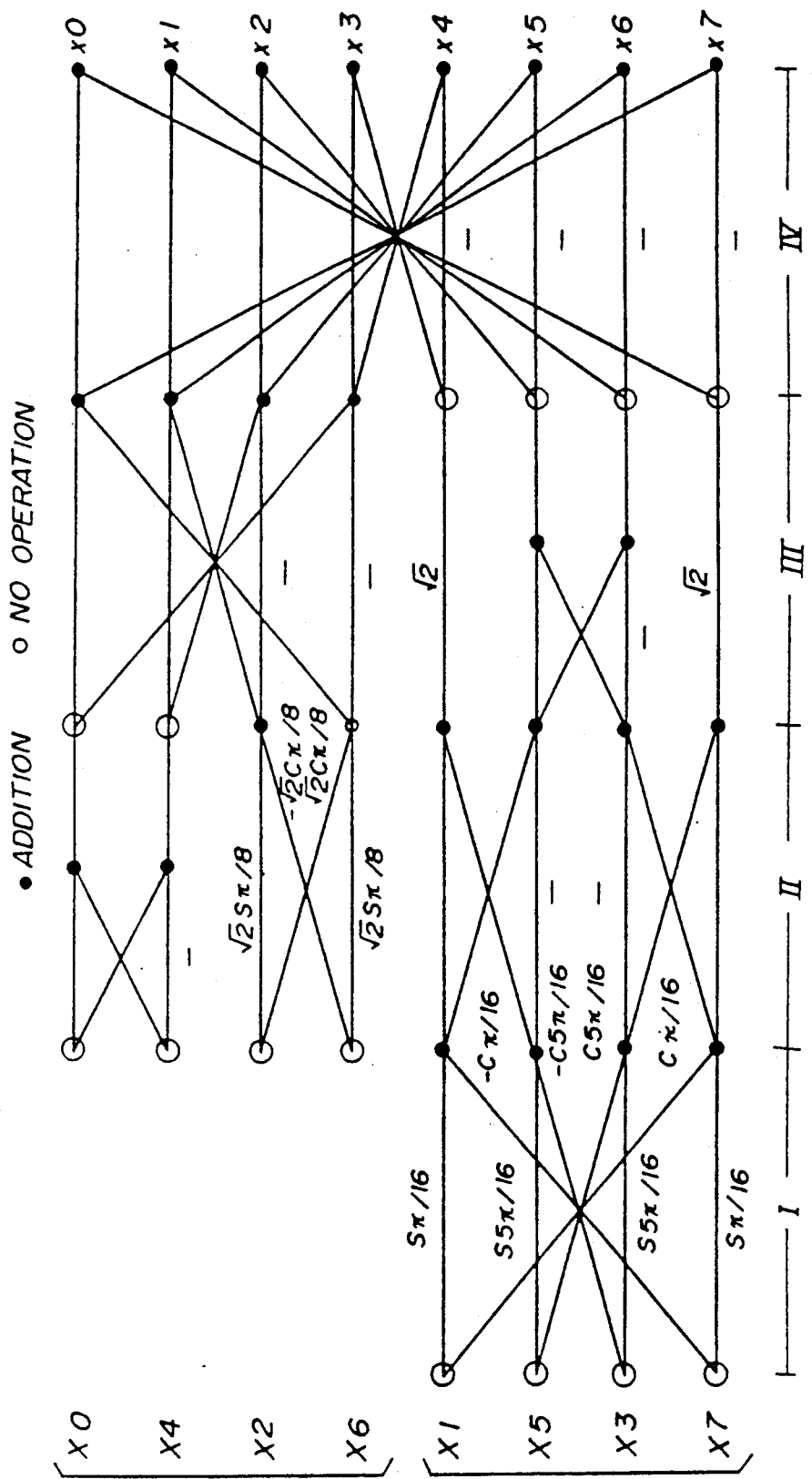
FIG. 12 is a diagram for explaining a second embodiment of an 8-element linear IFCT according to the present invention.

Next, a description will be given of a second embodiment of the data compression/restoration method according to the present invention, with special reference to FIGS. 11 and 12. FIG. 11 shows the algorithm of another improved Chen's 8-element linear FCT, while FIG. 12 shows the algorithm of another improved Chen's 8-element linear IFCT.

In FIG. 11, multiplication factors with respect to the upper four places x0 through x3 in a third step of the algorithm indicated by "III" in FIG. 11 are multiplied by $\sqrt{2}$, and multiplication factors with respect to the lower four places x4 through x7 in a second step indicated by "II" in FIG. 11 are multiplied by $\sqrt{2}$. Thus, the outputs X0 through X7 of the linear FCT respectively are equal to $\sqrt{2}$ times the values of the inputs x0 through x7. In FIG. 12, multiplication factors with respect to the upper four places X0, X4, X2, X6 in a second step of the algorithm indicated by "II" in FIG. 12 are multiplied by $\sqrt{2}$, and multiplication factors with respect to the lower four places X1, X5, X3, X7 in a third step indicated by "III" in FIG. 12 are multiplied by $\sqrt{2}$. Thus, the outputs x0 through x7 of the linear IFCT respectively are equal to $\sqrt{2}$ times the values of the inputs X0 through X7.

Figure 2:
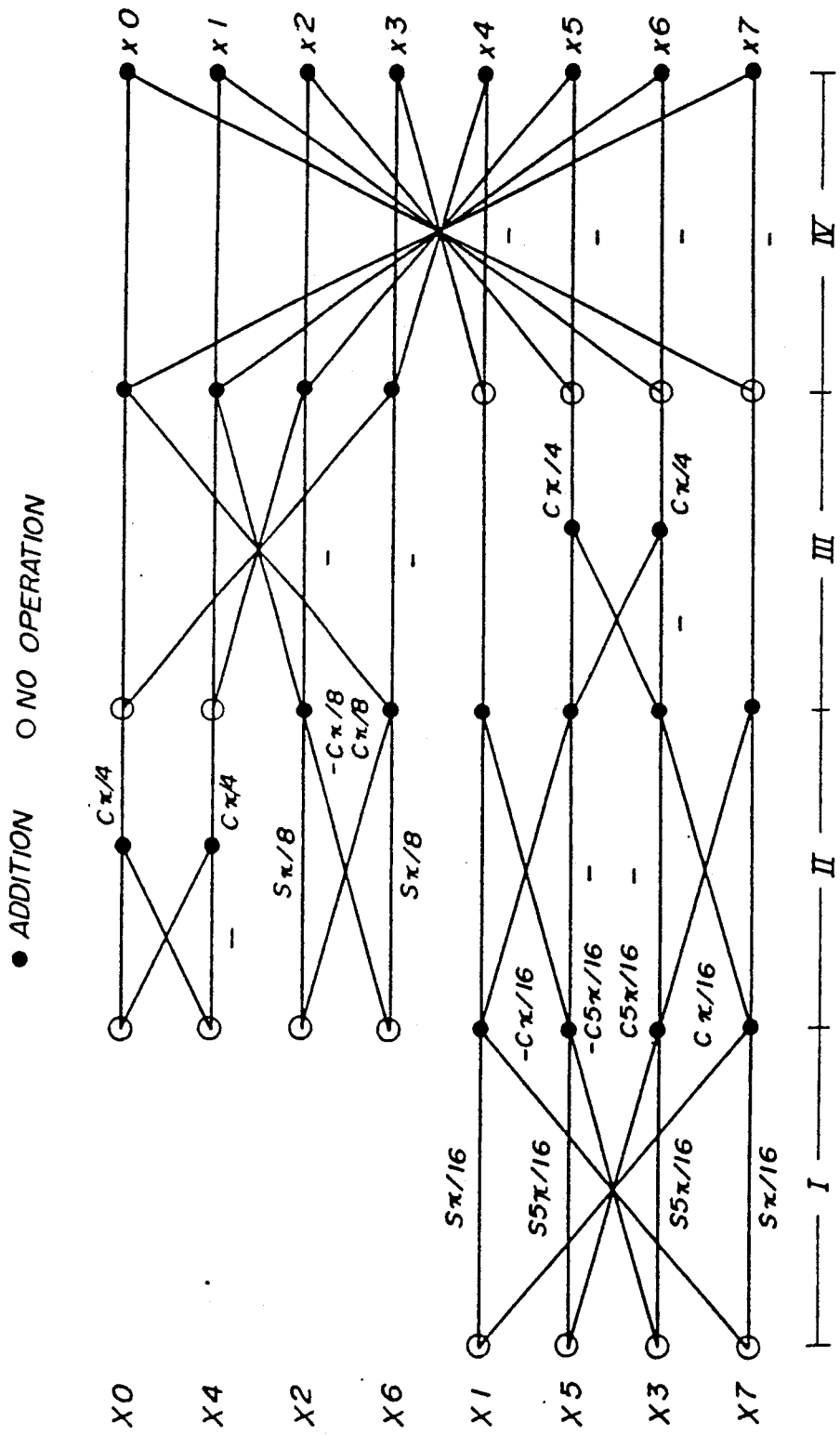
FIG. 2 is a diagram for explaining a conventional 8-element Chen IFCT algorithm.
Figure 3:
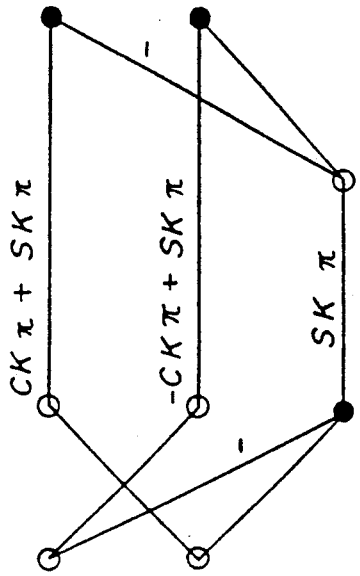
FIGS. 3A and 3B are diagrams showing a normal butterfly operation and a modified example of the butterfly operation.
Figure 4:
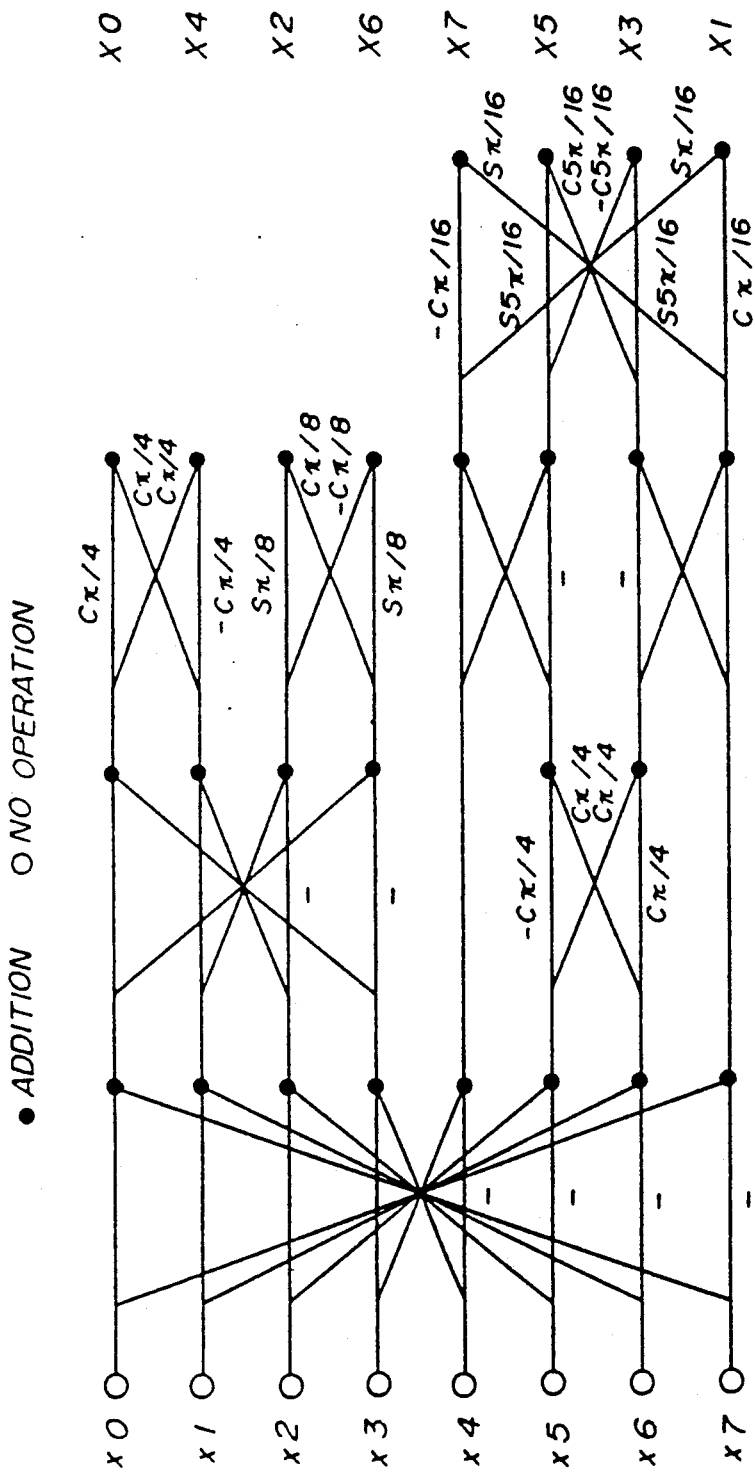
FIG. 4 is a diagram for explaining a conventional 8-element Wang FCT algorithm.
Figure 5:
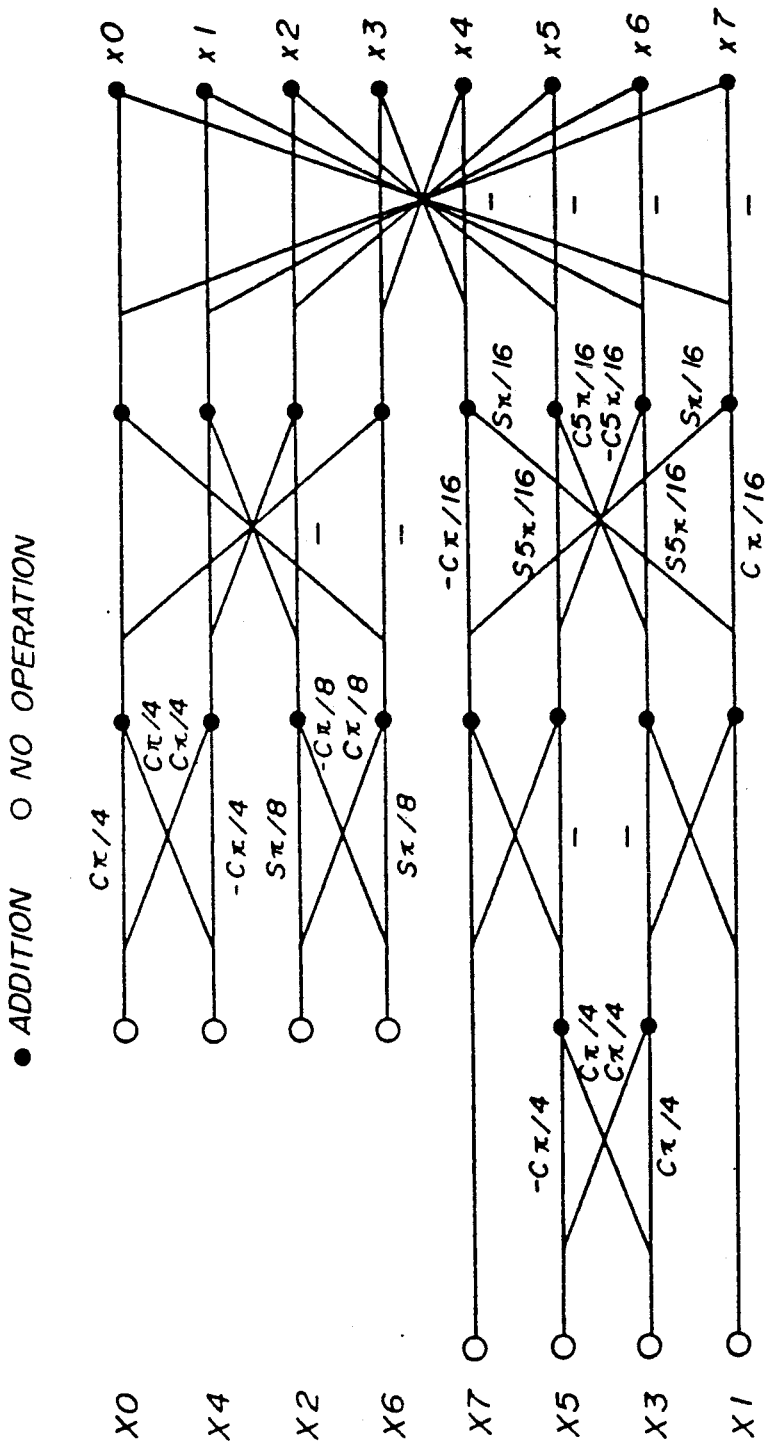
FIG. 5 is a diagram for explaining a conventional 8-element Wang IFCT algorithm.

Although the first and second embodiments relate to the Chen's algorithms shown in FIGS. 1 and 2, similar modifications can be made with respect to the Wang's algorithms shown in FIGS. 4 and 5.

Figure 13:
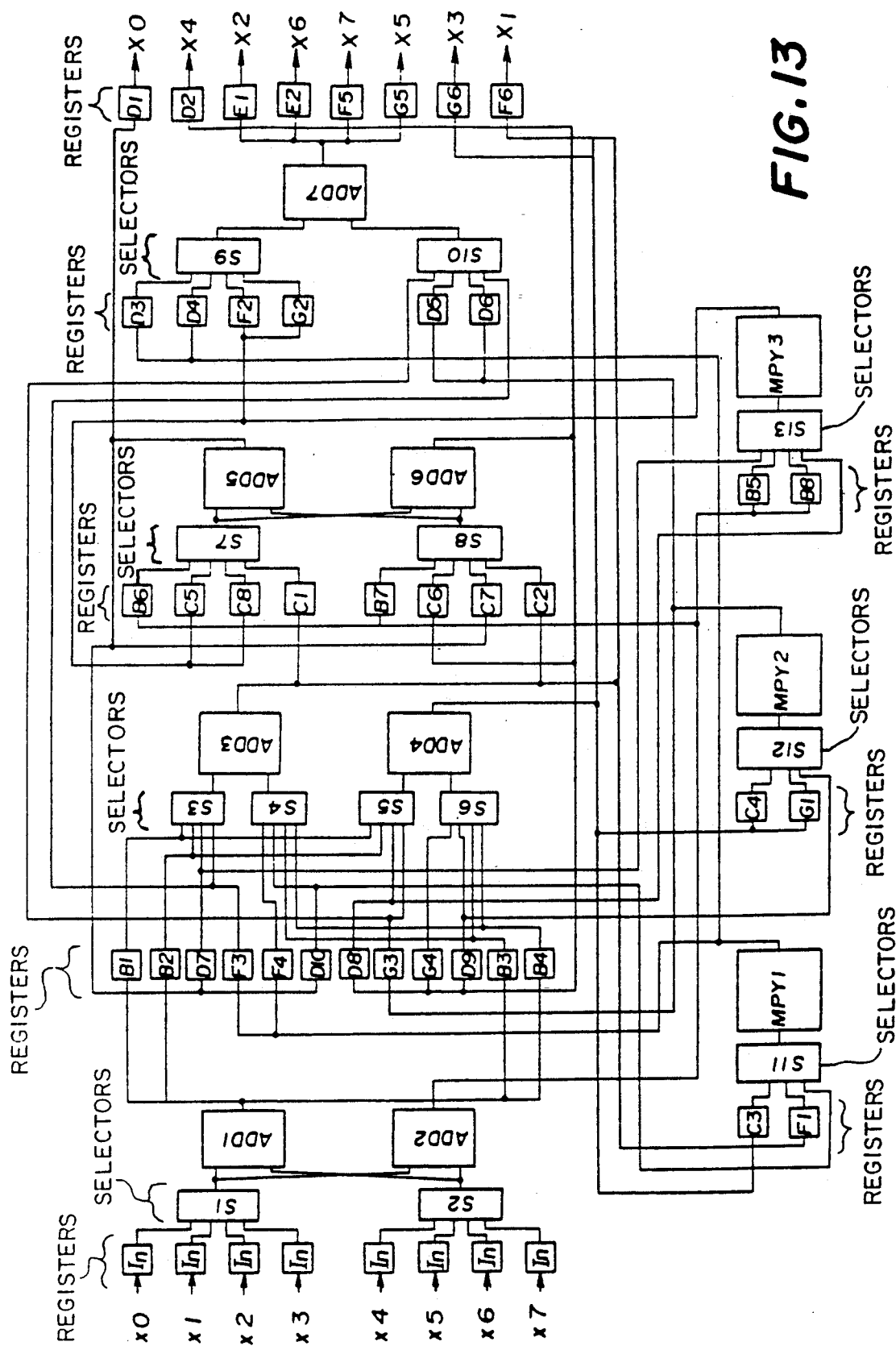
FIG. 13 is a block diagram showing an embodiment of a fast cosine transformation (FCT) circuit according to the present invention.

Next, a description will be given of the construction of an embodiment of the 8-element linear FCT circuit which may be applied to the data compression method according to the present invention, with special reference to FIGS. 13 and 14. The 8-element linear FCT unit as shown in FIG. 13 is constructed in accordance with an improved Wang's 8-element linear FCT algorithm shown in FIG. 14. This FCT unit employs three multipliers and seven adders to compute the 8-element linear fast cosine transformation.

In FIG. 13, MPY1 to MPY3 are multipliers, ADD1 through ADD7 are adders, S1 through S13 are selectors for selecting inputs, In, B1 to B8, C1 to C8, D1 to D10, E1 and E2, F1 to F6 and G1 to G6 are registers for latching data. In FIG. 14, alphanumeric characters such as "In", "B1", "C1" indicate registers which are the same as those corresponding alphanumeric characters in FIG. 13, and the results of calculating arithmetic operations shown in FIG. 14 are latched by the corresponding registers indicated in FIG. 13. The number in parentheses following the alphanumeric characters shown in FIG. 14, such as B1(4), C1(5), indicates the sequence of clock being counted from the start of the FCT operations when the operation corresponding to the alphanumeric characters is executed.

Figure 14:
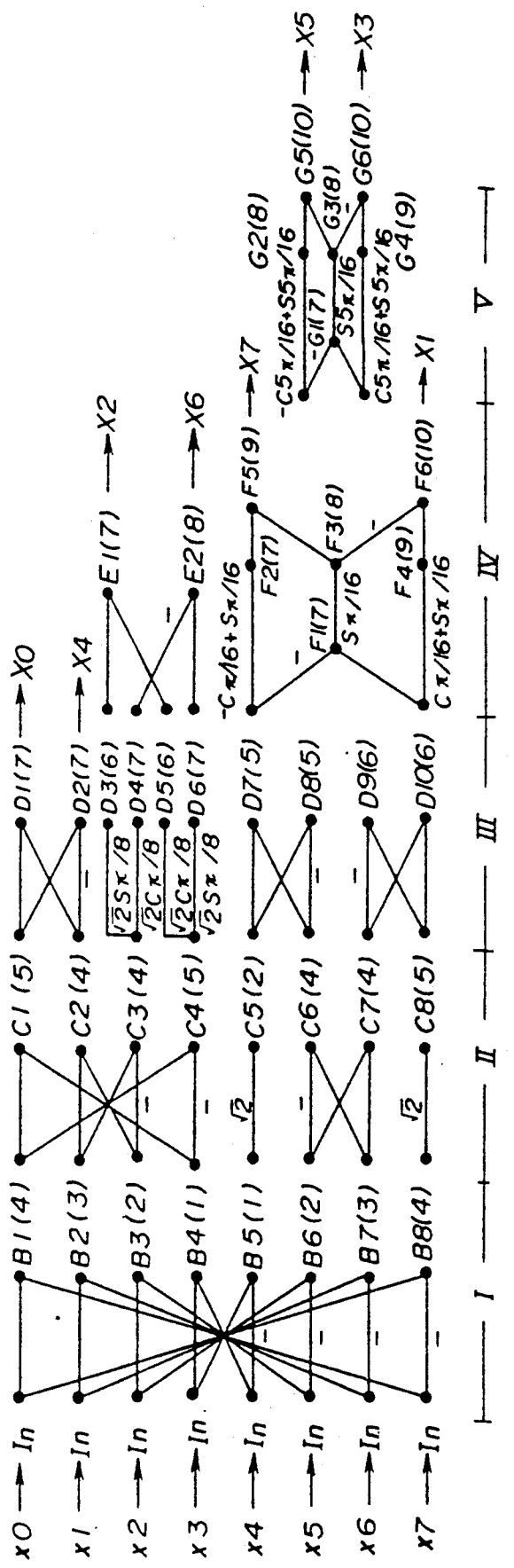
FIG. 14 is a diagram for explaining an improved 8-element Wang IFCT which may be applied to the FCT circuit shown in FIG. 13.

For example, at a time of a first clock #1CLK in a first step I of the FCT operations shown in FIG. 14, the additions indicated by B4(1) and B5(1) at the places x3 and x4 of the inputs are calculated, and the results of the additions are stored in the registers B4 and B5 shown in FIG. 13, respectively.

Next, at a time of a second clock #2CLK in a first step shown in FIG. 14, the additions indicated by B3(2) and B6(2) at the places X2 and x5 of the inputs are calculated, and the results of the additions are stored in the registers B3 and B6 shown in FIG. 13, respectively. In this manner, the linear FCT operations are carried out by means of the FCT unit shown in FIG. 13 in accordance with the algorithm indicated in FIG. 14.

In the third step III of the improved 8-element linear FCT algorithm shown in FIG. 14, multiplication factors with respect to the upper four places x0 through x3 of the inputs are multiplied by $\sqrt{2}$, and in the second step II of the algorithm shown in FIG. 14, multiplication factors with respect to the lower four places x4 through x7 are multiplied by $\sqrt{2}$ by modifying the Wang's algorithm as shown in FIG. 4. With the multiplication factors thus modified, the 8-element linear FCT can be computed by means of fourteen (14) multiplications and twenty six (26) additions.

In addition, a pipelining method can be applied to the FCT unit shown in FIG. 13 for making effective use of the adders and multipliers within the linear FCT unit. When the pipelining method is applied, the data flow in the algorithm shown in FIG. 14 is modified at the places x2 and x3 in the third step III, the places x2 through x7 in the fourth step IV and the places x5 and x6 in the fifth step V as indicated in FIG. 14. As the result, the 8-element linear FCT can be carried out by means of twelve (12) multiplications and twenty eight (28) additions.

As described above, the predetermined operations are performed by the predetermined operation devices in accordance with the predetermined sequence. These operations to be executed at the predetermined clock times respectively are assigned to the multipliers MPY1 through MPY3 and the adders ADD1 through ADD7 shown in FIG. 13. FIG. 15 shows an example of the assignment of the operations to these devices. In a case of the multiplier MPY1 shown in FIG. 13, a multiplication of the position F4 at the first clock #1CLK, a multiplication of the position D3 at the second clock #2CLK, a multiplication of the position D4 at the third clock #3CLK and a multiplication of the position F3 at the fourth clock #4CLK are assigned to the multiplier MPY1, as shown in FIG. 15, so that these multiplications are executed in this sequence by this device MPY1.

In a case of the adder ADD1, an addition of the position B4 at the first clock #1CLK, an addition of the position B3 at the second clock #2CLK, an addition of the position B2 at the third clock #3CLK and an addition of the position B1 at the fourth clock #4CLK are assigned to the additions are executed in this sequence by this device ADD1. Also, in cases of the other multipliers MPY2 and MPY3 and the other adders ADD2 to ADD7, the assignment of operations is made in a similar manner as shown in FIG. 15.

Accordingly, the sets of multiplications to be executed for four clock times at four different places of one group are assigned evenly to the three multipliers MPY1 to MPY3 in the FCT circuit, and the sets of additions to be executed for four clock times at four different places are assigned evenly to the seven adders ADD1 through ADD7.

As the result, all the operations by the multipliers and the adders shown in FIG. 15 are repeated and recur at a period of four clock times. The sets of multiplications and the sets of additions assigned to the multipliers and the adders are repeated at a period of four clock times.

Because image data having 8 bits is input to the FCT circuit, an operation clock must have a frequency twice as high as the frequency of a data input clock. For example, when the frequency of the data input clock is 20 MHz, the frequency of the operation clock is 40 MHz.

In the FCT circuit shown in FIG. 13, selectors Si through S13 are provided in front of the multipliers MPY1 to MPY3 and the adders ADD1 to ADD7. These selectors are controlled to select input data so that the multipliers and the adders each perform an arithmetic operation between specific two inputs. For example, in a case of an addition being executed at the place B4(l), a selector S1 selects an input x3 through a register In and a selector S2 selects an input x4 through a register In. Then, the adder ADD1 executes an addition between the inputs x3 and x4, and stores the result of the addition in a register B4.

Figure 16:
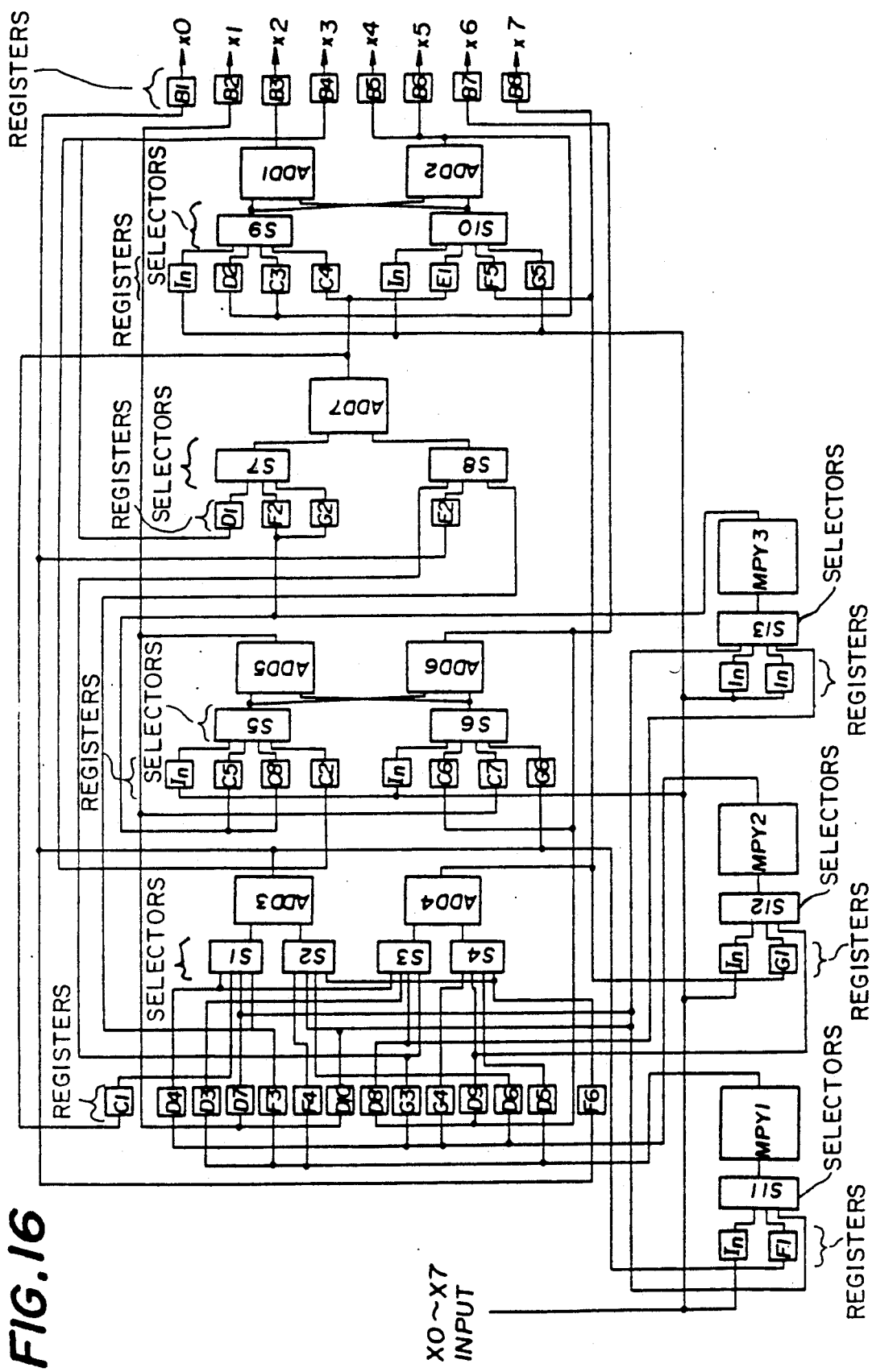
FIG. 16 is a block diagram showing an embodiment of an inverse fast cosine transformation (IFCT) circuit according to the present invention.
Figure 17:
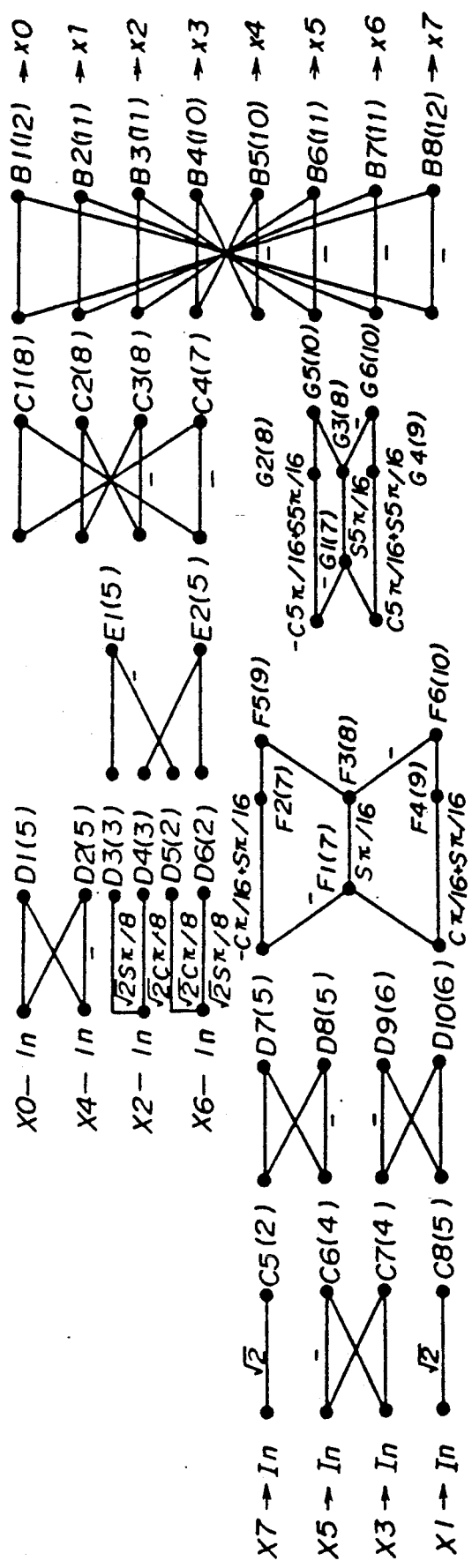
FIG. 17 is a diagram for explaining an improved 8-element Wang IFCT which may be applied to the IFCT circuit shown in FIG. 16.

FIG. 16 shows an embodiment of a linear 8-element inverse fast cosine transformation (IFCT) circuit which may be applied to the data restoration method according to the present invention. FIG. 17 shows an improved Wang linear 8-element IFCT algorithm. In accordance with this algorithm, the IFCT circuit shown in FIG. 16 is constructed. Similar to the above FCT circuit shown in FIG. 13, the IFCT circuit shown in FIG. 16 comprises three multipliers MPY1 to MPY3, and seven adders ADD1 to ADD7.

FIG. 18 shows an example of the assignment of the operations to the three multipliers and the seven adders by which the computation of the 8-element linear IFCT is achieved. In FIGS. 16 to 18, those parts that are the same as those corresponding parts in FIGS. 13 to 15 are designated by the same alphanumeric characters and symbols, and a description thereof will be omitted. When the IFCT circuit shown in FIG. 16 is used, the 8-element linear IFCT can be computed by means of twelve (12) multiplications and twenty-eight (28) additions, as in the case of the FCT circuit shown in FIG. 13.

As will be appreciated by those skilled in the art in view of the foregoing, the subject matter of the patent application is directed to FCT-based coding and decoding methods for handling two-dimensional image data with multilevel tone bits. The invention achieves rapid encoding and decoding processes of the image data, and simplifies circuitry of the encoder and decoder due by reducing the number of operations required for the processes, thereby reducing the number of the required multipliers and adders.

For example, in the encoding process, the first FCT coefficients are generated by means of the first $N \times 1$ FCT circuit, so as to reduce the number of the required multiplications. Similarly, the second FCT coefficients are generated by means of the second $N \times 1$ FCT circuit, some of the coefficients being multiplied by $\sqrt{2}$ so as to reduce the number of the required multiplications. The quantizer uses one of $N \times N$ corresponding values from a quantization table for quantizing each of the second FCT coefficients, the $N \times N$ corresponding values being multiplied by 2.

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

What is claimed is:

1. A method of using a fast cosine transformation (FCT) process to encode two-dimensional original image data described in a set of blocks of $N \times N$ picture elements, the method comprising the steps of:

a) inputting each block of $N \times N$ picture elements from the two-dimensional original image data;

b) using a first $N \times 1$ FCT circuit, transforming the $N \times N$ picture elements of each block into $N \times N$ values of first FCT coefficients, the first $N \times 1$ FCT circuit having multiplication factors of prescribed butterfly operations that generate the first FCT coefficients, the multiplication factors being multiplied by $\sqrt{2}$;

c) storing in a transposition memory the $N \times N$ values of the first FCT coefficients that are output by the first $N \times 1$ FCT circuit;

d) using a second $N \times 1$ FCT circuit, transforming the $N \times N$ values of the first FCT coefficients supplied from the transposition memory into $N \times N$ values of second FCT coefficients, the second $N \times 1$ FCT circuit having multiplication factors of prescribed butterfly operations for generating the second FCT coefficients, the multiplication factors being multiplied by $\sqrt{2}$;

e) quantizing each of the N×N values of the second FCT coefficients using one of N×N corresponding values from a quantization table, the N×N corresponding values being multiplied by 2; and f) entropy-encoding the quantized second FCT coefficients so as to produce compressed image data described in blocks of N×N output values.

2. The method as claimed in claim 1, wherein:
the first N×1 FCT circuit has no greater than three multipliers and seven adders; and
the second N×1 FCT circuit has no greater than three multipliers and seven adders.

3. The method as claimed in claim 1, wherein:
the two-dimensional original image data is divided into a set of blocks of 8×8 picture elements, in eight rows and eight columns.

4. The method as claimed in claim 2, wherein:
the three multipliers of each of the first and second N×1 FCT circuits execute twelve multiplications in a parallel manner; and
the seven adders of each of the first and second N×1 FCT circuits execute twenty-eight additions in a parallel manner.

5. The method as claimed in claim 3, wherein:
each of the first and second N×1 FCT circuits has no greater than three multipliers and seven adders;
the three multipliers execute twelve multiplications in a parallel manner; and
the seven adders execute twenty-eight additions in a parallel manner.

6. A method of using an inverse fast cosine transformation IFCT process to decode two-dimensional compressed image data described in a set of blocks of N×N picture elements, the method comprising the steps of:

a) entropy-decoding each block of the two-dimensional compressed image data so as to generate N×N values of quantized FCT coefficients;

b) dequantizing each of the quantized FCT coefficients so as to generate a set of N×N values of first FCT coefficients;

c) using a first N×1 IFCT circuit, inversely transforming the N×N values of the first FCT coefficients into N×N values of second FCT coefficients, the first N×1 IFCT circuit having multiplication factors of prescribed butterfly operations for generating the second FCT coefficients, the multiplication factors being multiplied by $\sqrt{2}$;

d) storing in a transposition memory the N×N values of the second FCT coefficients output by the first N×1 IFCT circuit; and e) using a second N×1 IFCT circuit, inversely transforming the N×N values of the second FCT coefficients supplied from the memory so as to produce reconstructed image data described in blocks of N×N output values, the second N×1 IFCT circuit having multiplication factors of prescribed butterfly operations for generating the reconstructed image data, the multiplication factors being multiplied by $\sqrt{2}$, wherein the dequantizing step includes:
1) using one of N×N corresponding values from an inverse quantization table, the N×N corresponding values being multiplied by $\frac{1}{2}$.

7. The method as claimed in claim 6, wherein:
the first N×1 IFCT circuit has no greater than three multipliers and seven adders; and
the second N×1 IFCT circuit has no greater than three multipliers and seven adders.

8. The method as claimed in claim 6, wherein:
the two-dimensional compressed image data is divided into a set of blocks of 8×8 picture elements in eight rows and eight columns.

9. The method as claimed in claim 7, wherein:
the three multipliers of each of the first and second N×1 IFCT circuits execute twelve multiplications in a parallel manner; and
the seven adders of each of the first and second N×1 IFCT circuits execute twenty-eight additions in a parallel manner.

10. The method as claimed in claim 8, wherein:
each of the first and second N×1 IFCT circuits has no greater than three multipliers and seven adders;
the three multipliers execute twelve multiplications in a parallel manner; and
the seven adders execute twenty eight additions in a parallel manner.

* * * * *